US012540063B1

(12) United States Patent
Cook

(10) Patent No.: US 12,540,063 B1
(45) Date of Patent: Feb. 3, 2026

(54) DEVICE FOR REPOSITIONING A FORK OF A FORKLIFT

(71) Applicant: Michael Brodie Cook, Pelion, SC (US)

(72) Inventor: Michael Brodie Cook, Pelion, SC (US)

( * ) Notice: Subject to any disclaimer, the term of this patent is extended or adjusted under 35 U.S.C. 154(b) by 3 days.

(21) Appl. No.: 18/794,422

(22) Filed: Aug. 5, 2024

(51) Int. Cl.
*B66F 9/075* (2006.01)

(52) U.S. Cl.
CPC ................................ *B66F 9/07504* (2013.01)

(58) Field of Classification Search
CPC .......... B66F 9/07504; B66F 9/12; B66F 9/14; B66F 9/142; B66F 9/144; B66F 9/146; B66F 9/148
See application file for complete search history.

(56) References Cited

U.S. PATENT DOCUMENTS 2,642,157 A 6/1953 Milz
2,668,602 A 2/1954 Cushman
2,847,138 A 8/1958 Backofen et al.
2,975,924 A 3/1961 Kopanski
3,027,033 A 3/1962 Schuster
3,754,673 A * 8/1973 Barda .................... B66F 9/143 414/667
3,780,896 A 12/1973 Crawford
4,002,256 A 1/1977 Kroboth
4,113,128 A 9/1978 Foss
4,221,535 A 9/1980 Quinn
4,497,607 A 2/1985 Johannson
5,897,288 A 4/1999 Green
6,902,039 B2 * 6/2005 Kunch ...................... B66F 9/12 187/222
2008/0175700 A1 * 7/2008 McGrane ............ B66F 9/07563 414/785
2016/0176690 A1 * 6/2016 Iotti ........................ B66F 9/148 414/667
2018/0354761 A1 * 12/2018 Addicott ................ B66F 9/146
2022/0315403 A1 * 10/2022 Yang ....................... B66F 9/142

FOREIGN PATENT DOCUMENTS

KR 102013106 10/2019

* cited by examiner

*Primary Examiner* — Minh Truong
(74) *Attorney, Agent, or Firm* — Bill Killough

(57) ABSTRACT

A device for repositioning a fork of a fork lift is formed as a U-shaped construct that surrounds an upper end of the fork, with a pivoting repositioning bar attached to the construct. The construct has a first vertical member, a second vertical member that is spaced apart from the first vertical member, and a bridge member connecting the first vertical member to the second vertical member, with the bridge member positioned at a top portion of the first vertical member and the second vertical member. The repositioning bar extends above the bridge member when the repositioning bar is in use, and is pivoted to a position alongside the U-shaped construct when not in use.

9 Claims, 8 Drawing Sheets

DEVICE FOR REPOSITIONING A FORK OF A FORKLIFT

BACKGROUND OF THE INVENTION

Forklifts are essential machines in numerous industries, including warehousing, manufacturing, and logistics. Repositioning of forklift forks to alter the spacing between forks is necessary to accommodate different pallet sizes or differences in loads. While forklifts provide a means to slide the forks for repositioning, the forks must be manually relocated in many forklifts. The forks are heavy and difficult to move for many operators. This invention addresses these challenges by providing a device that enables safer and easier manual repositioning of forklift forks.

SUMMARY OF THE INVENTION

The present invention introduces a novel device designed to provide easier and quicker repositioning and securing of forks (fork blades) of a forklift. Vertical members are connected by a bridge member. This construct provides a robust structure that is clamped to and surrounds an upper portion of a fork. A rotatable repositioning bar is provided. The rotatable repositioning bar communicates with the construct and provides a handle for precise positioning and spacing of forks with less manual exertion and strain. The invention reduces physical bending and twisting by the operator, reduces operator strain, keeps hands and fingers out and away from pinch points, enhances operational safety and efficiency, and reduces the risk of accidents or damage during forklift operations.

DESCRIPTION OF PREFERRED EMBODIMENTS

Figure 5:
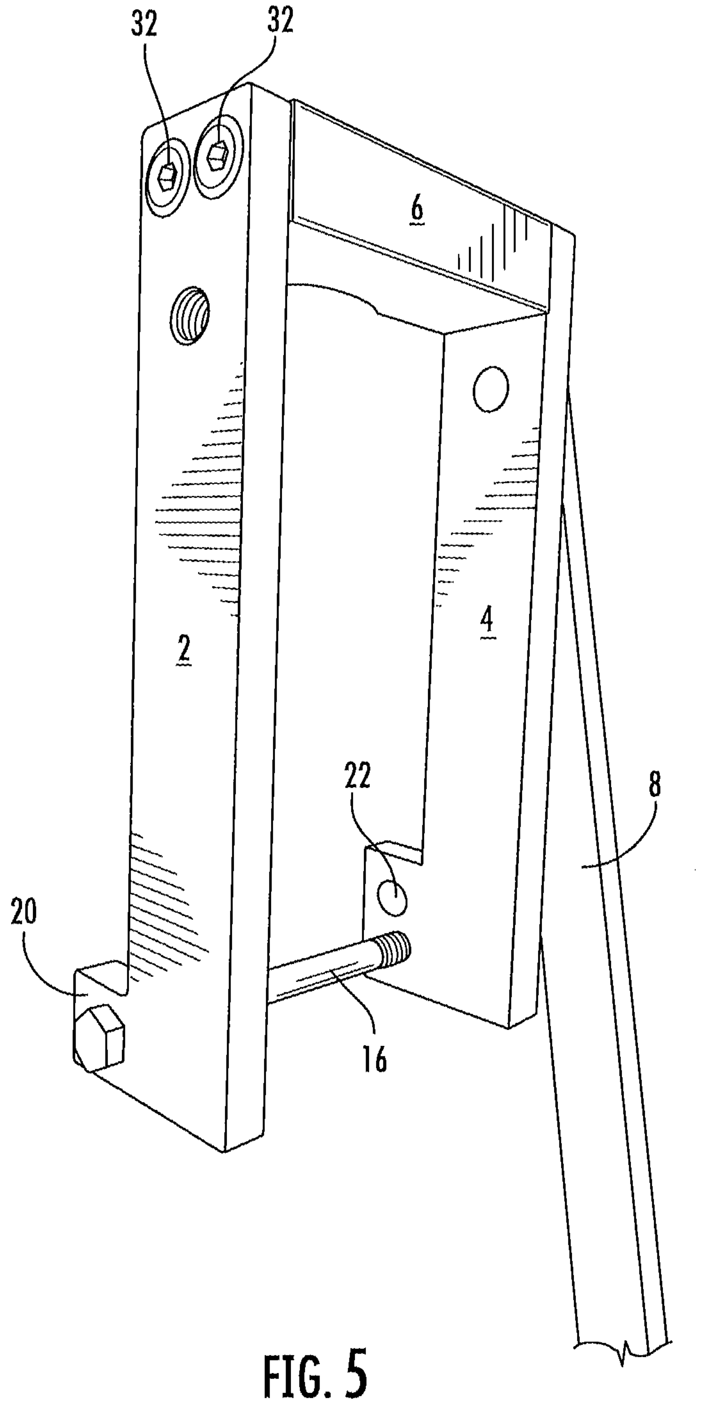
FIG. 5 is a front perspective isolation of the device for repositioning a fork of a forklift.
Figure 6:
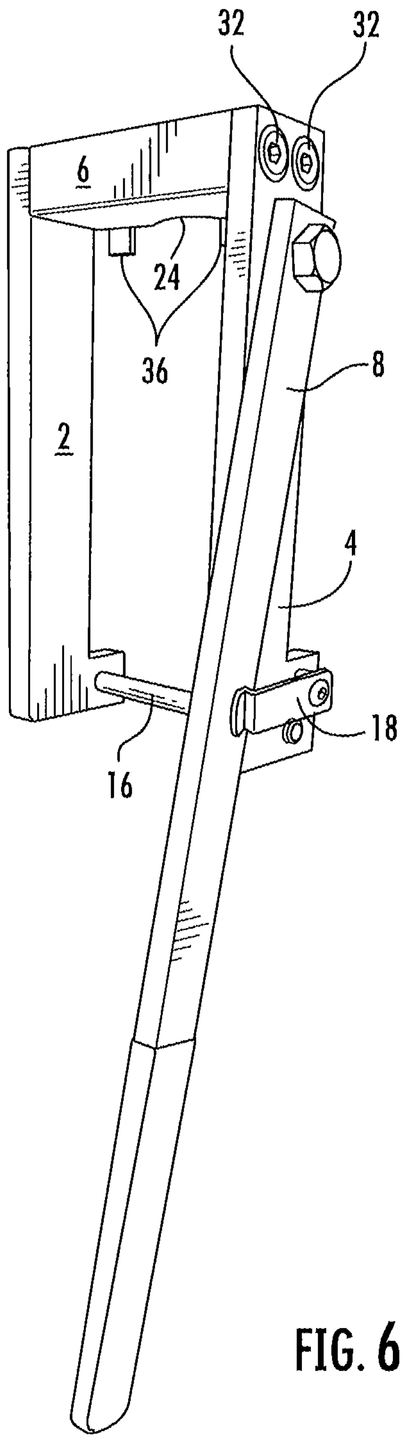
FIG. 6 is a front perspective isolation of the device shown in FIG. 5.
Figure 7:
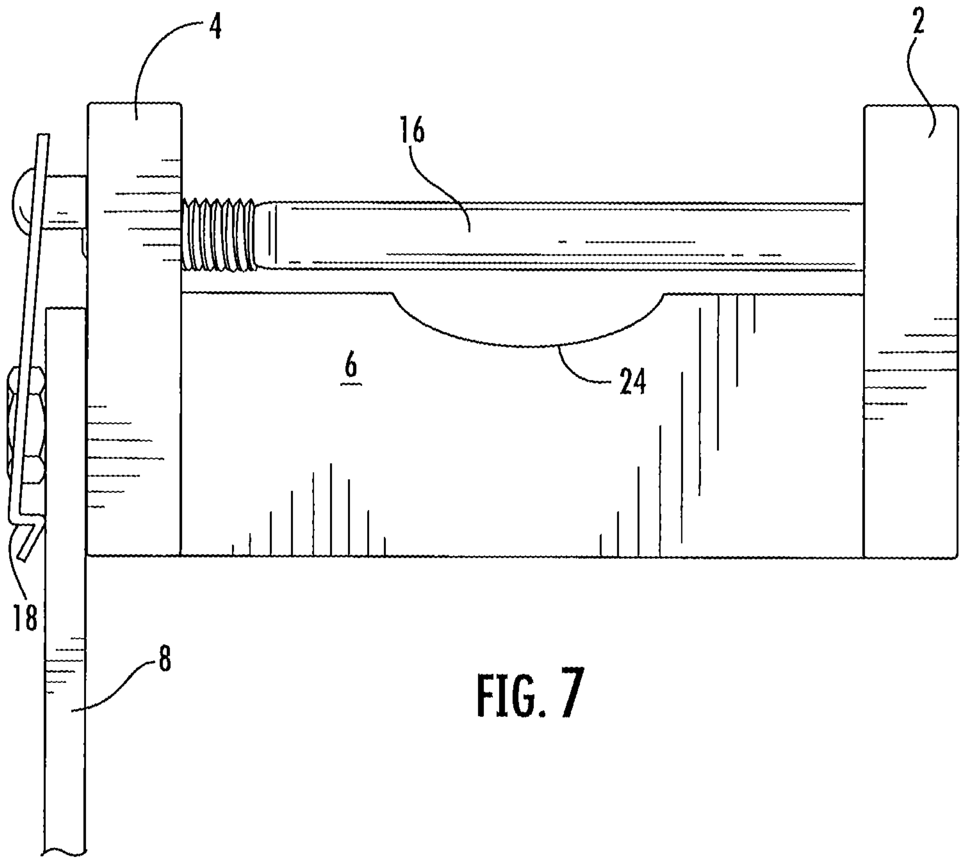
FIG. 7 is partial elevation taken from the bottom of the device.
Figure 8:
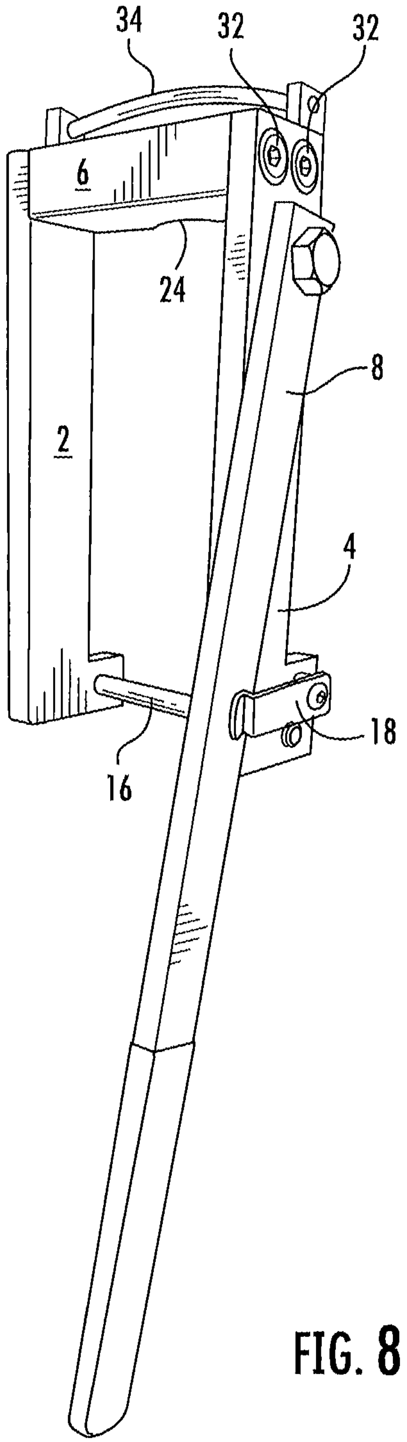
FIG. 8 is a front perspective isolation of the device shown in FIG. 6, with an optional repositioning pin retainer filled to the device for repositioning a fork of a forklift mounted to a fork of a forklift.

Turning to the drawings, FIG. 6 shows a first vertical member 2, a second vertical member 4 and a bridge member 6. The first vertical member forms one side of a U-shaped construct. The first vertical member is positioned alongside one vertical side of a forklift fork 10. The second vertical member is spaced apart from the first vertical member. This component mirrors the first vertical member on the opposite side of the fork, creating a channel-like structure to encase a top of the fork 10. The bridge member connects the first vertical member to the second vertical member. The generally horizontal bridge member joins the two vertical members at their top portions, forming a U-shaped structure when viewed from the front or rear. FIG. 5. The bridge member provides structural integrity and helps distribute forces across the device.

Figure 1:
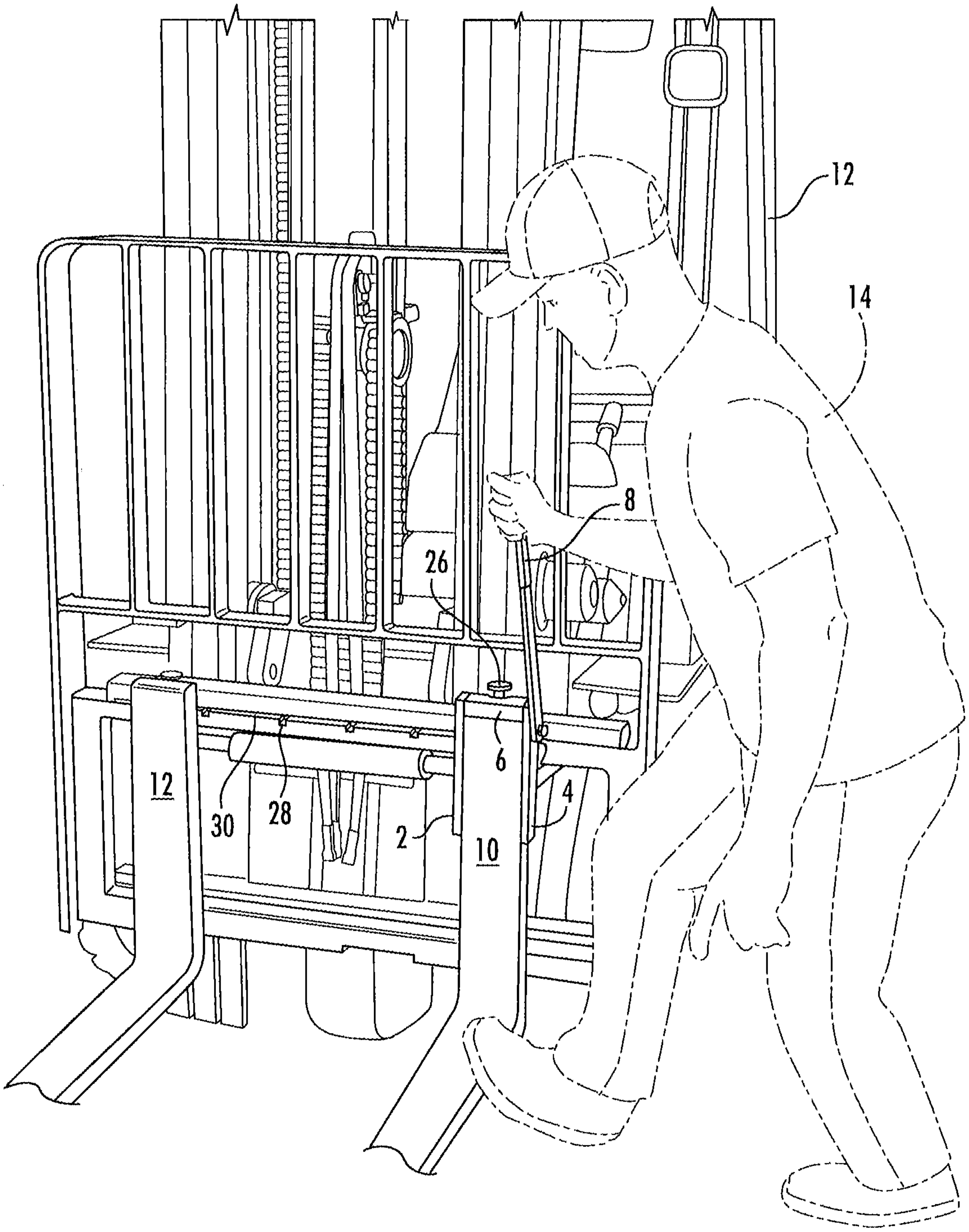
FIG. 1 is a perspective view showing the device for repositioning a fork of a forklift mounted to a fork of a forklift.
Figure 2:
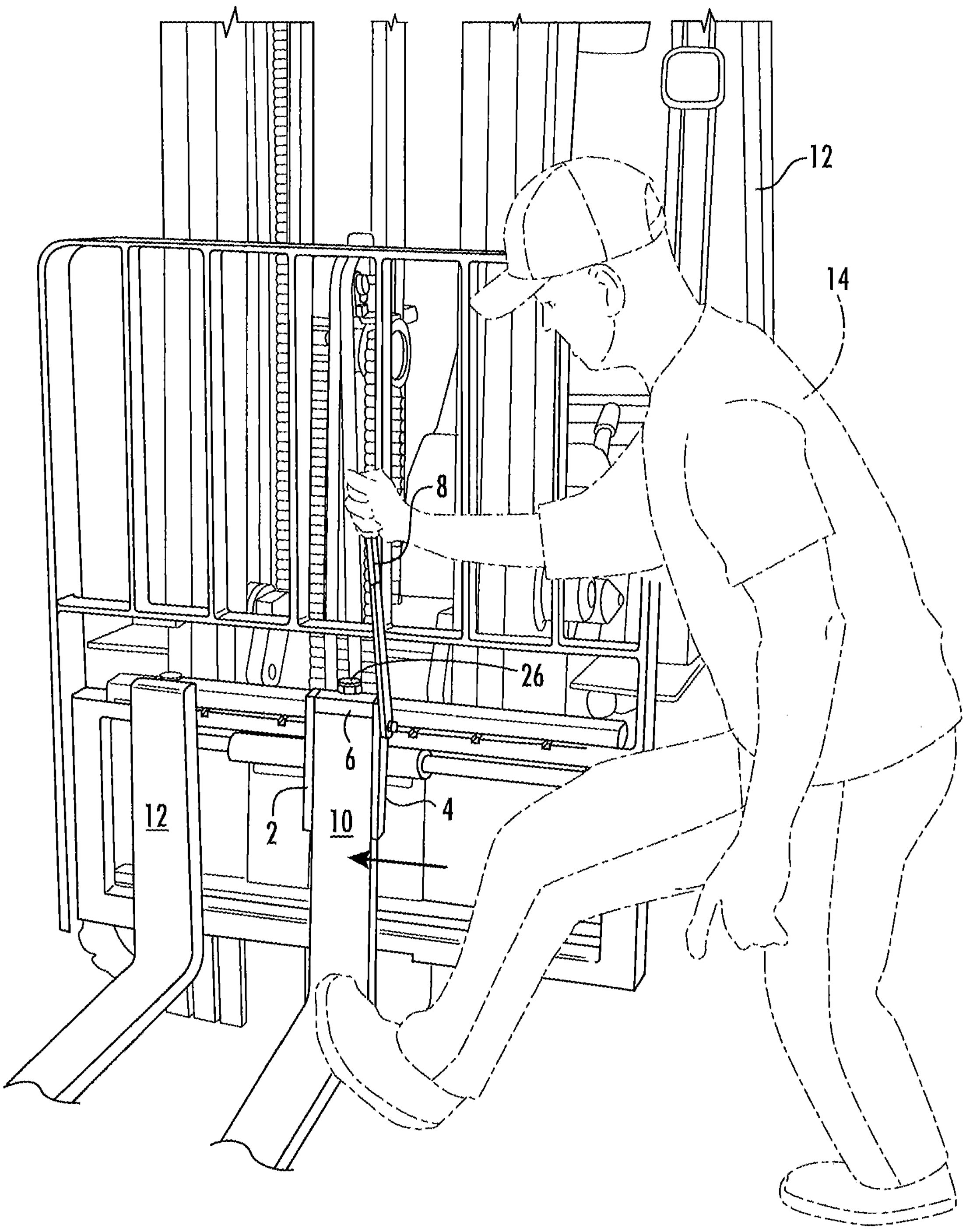
FIG. 2 is a perspective view showing the device for repositioning a fork of a forklift mounted to a fork of a forklift demonstrating movement of a fork.
Figure 3:
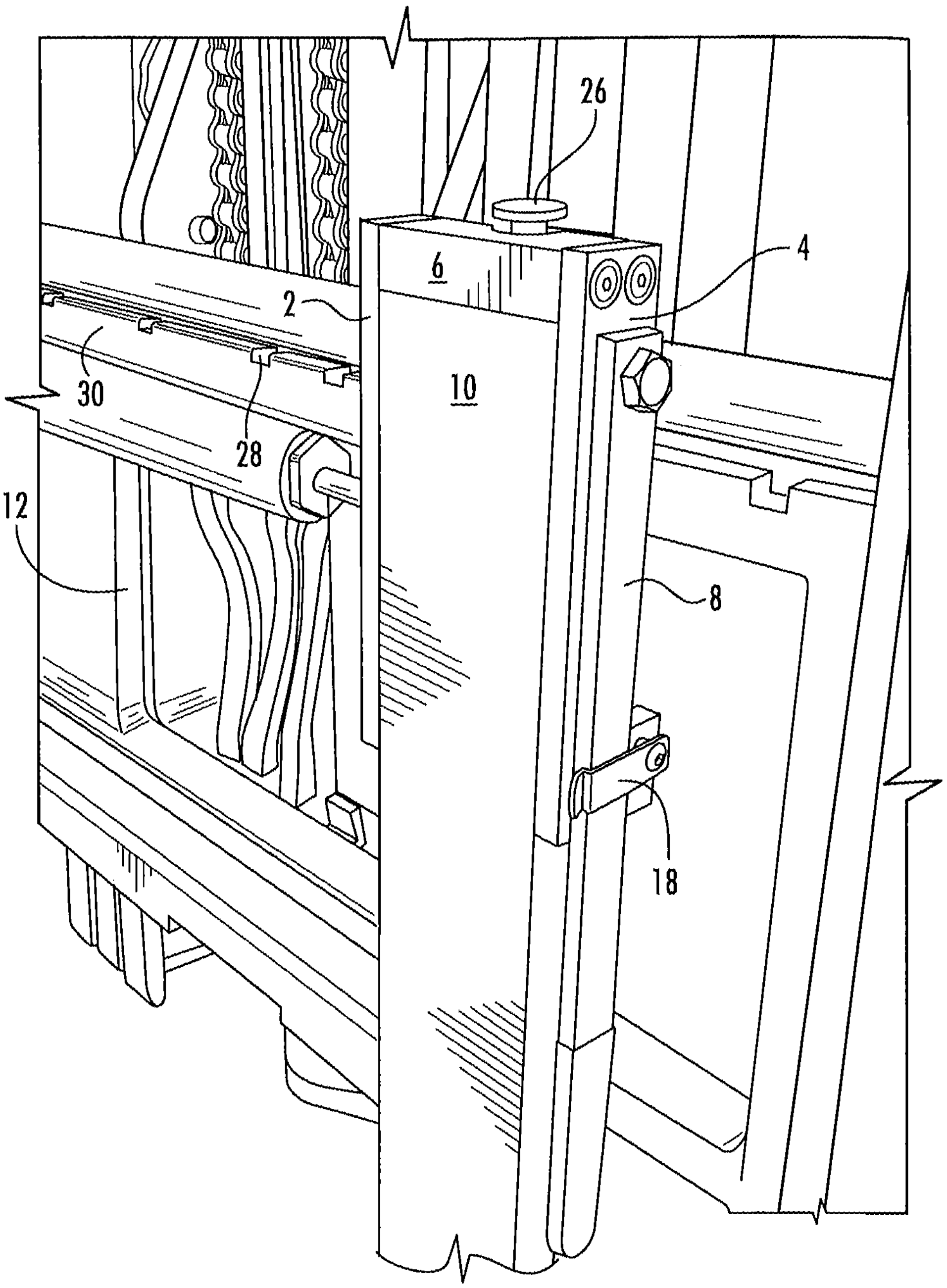
FIG. 3 is a partial perspective view showing the device for repositioning a fork of a forklift mounted to a fork of a forklift.
Figure 4:
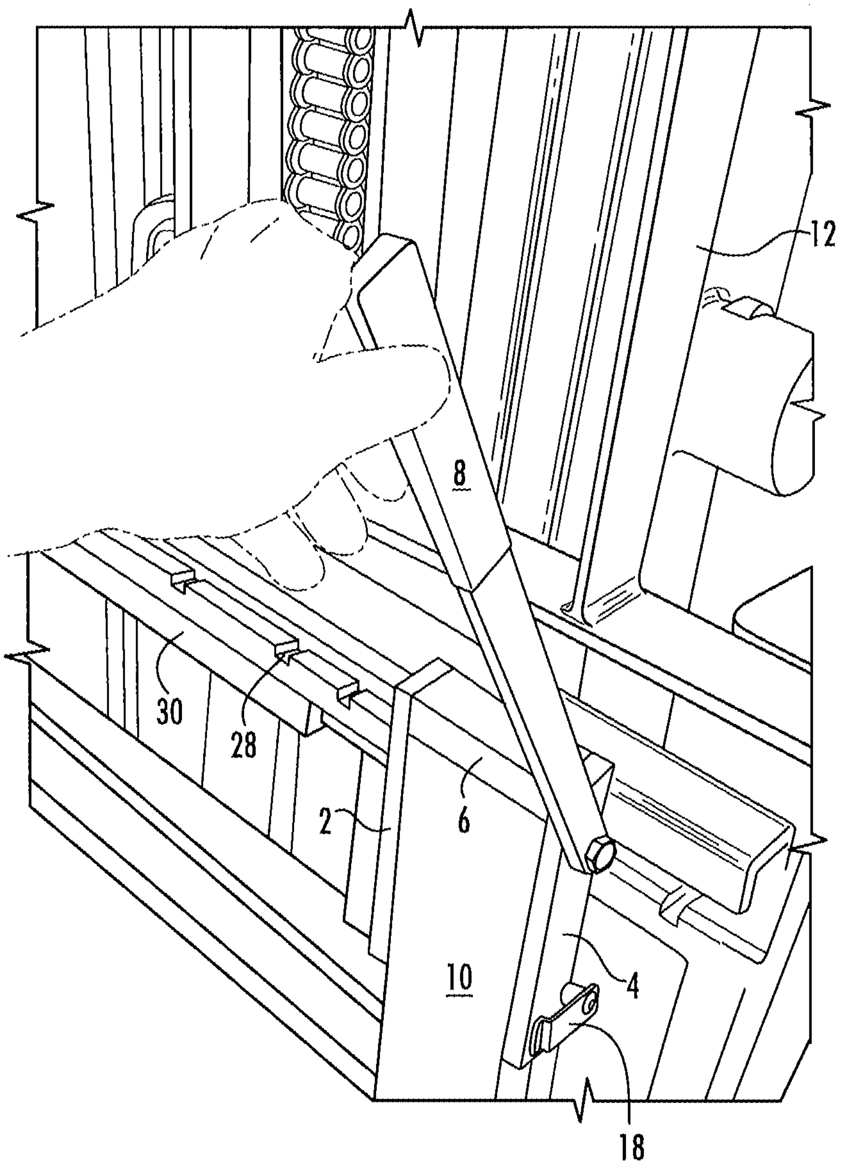
FIG. 4 is the partial perspective view of FIG. 3 showing rotation of a handle of the device toward a vertical position.

A repositioning bar 8 is connected to an outside of the second vertical member 4. The repositioning bar is connected to an outside surface of the second vertical member in a relationship that allows the repositioning bar to pivot from a downward pointing, vertical position when not in use (FIG. 3), and to be movable to a more vertical position when in use. FIG. 1; FIG. 2; FIG. 4. The second vertical member is preferred to be the outboard member, so that the repositioning bar is on the outer side of the fork 10. The second vertical member may be on the right side or the left side of the fork depending upon the fork to which the device is attached.

When pivoted and raised for use (upwardly and generally vertically positioned), the repositioning bar's length extends beyond the top of the bridge member 6. FIG. 1. This extended position provides leverage for the operator 14 to push or pull the repositioning bar 8 to slide and move the fork 10. FIG. 2.

When fully lowered (pointing downward and vertically positioned), the repositioning bar 8 stays within the lateral profile of the second vertical member 4, not extending beyond the front or rear sides of the fork 10. FIG. 3. This ensures a compact form when the repositioning bar is not in use, and stores the repositioning bar so that it does not interfere with the loading or operation of the fork lift 12.

The construct formed by the first vertical member 2, second vertical member 4, and bridge member 6, is specifically designed and constructed to surround a top and a portion of both vertical sides of a forklift fork 10. This encasing provides a robust design with a secure fit with the fork to remain securely joined to the fork during movement of the heavy fork, providing better positioning of the operator and reduced physical effort by the operator. A clamping member 16 pulls the first vertical member toward the second vertical member and enhances the construct's grip on the fork. FIG. 6 shows optional back stops 36 that prevent the device from moving toward the front of the fork lift in use. The back stops extend downwardly from the bridge member but preferably not into the interior of the U-shaped device. The back stops are shown as a pair of tabs that extend from the bridge member and do not interfere with movement of the positioning pin 26, but could be formed in other shapes and sizes that achieve the same function.

The clamping member 16 is tightened to pull the vertical members 2,4 toward each other and against the fork 10 thereby providing a snug fit to the construct during operation as the repositioning bar applies a force to the construct. FIG. 3. The clamping member may be a threaded rod or bolt in some embodiments. Positioning the clamping member between the fork 10 and the forklift 12 allows for optimal positioning of cargo on the forks without interference from the construct and clamping member. In a preferred embodiment, bolts 32, which may be steel bars, connect the first vertical member, second vertical member, and bridge member, and apply a clamping force to the top of the fork.

A repositioning bar retainer 18 on the exterior of the second vertical member provides a secure storage device for the repositioning bar when not in use. This feature keeps the bar readily accessible, while maintaining a streamlined profile for the device with the repositioning bar stored so as to not interfere with forklift operations. The repositioning bar retainer is spaced apart from the second vertical member to receive the repositioning bar between repositioning bar retainer and the second vertical member, which is on the outboard side of the fork lift. The repositioning bar retainer has an opening on the fork side.

In a preferred embodiment, the repositioning bar retainer is formed of spring steel. The opening is formed as a lip whose opening is reduced in being spaced apart from the second vertical member at the connection to the center section, with center section constructed and arranged to receive and hold the repositioning bar. The lip extends away from the second vertical member at an angle to form a larger exterior opening to receive the repositioning bar and funnel it toward the center section.

In a preferred embodiment a foot member 20, 22 extends from each of the vertical members and toward the rear of the construct. The clamping member 16 extends through foot 22 and foot 24, intersecting the first vertical member 2 and the second vertical member 4 to pull the vertical members toward each other, holding the construct in place on the fork 10, and enhancing stability. A plurality of clamping members may be used to increase the clamping force.

An indentation 24 in the rear portion of the bridge member's top accommodates a fork blade positioner pin 26 that secures the fork 10 in position on the forklift. Fork blade positioner pin secures the fork blades 10, 12 in position after the spacing is selected by the operator 14. The pin or rod is inserted through a hole in the fork blade and a corresponding hole or detent 28 in the fork carriage 30 that corresponds to the spacing.

In the embodiment of the device shown in FIG. 9, the device has a strap 34 mounted on the top of the bridge 6. The strap has an elastic property. When positioner pin 26 is pulled up to release the fork from the detent 28 in the fork carriage, the strap is placed around the positioner pin on the fork lift side and below a head of the positioner pin to hold the pin in the up and disengaged position and keep the positioner pin from falling into a detent as the fork is repositioned. The elastic property applies pressure to the shank of the pin to hold it in the up and disengaged position. The strap may be removed from the pin and the pin may be placed in a selected detent after the fork is moved.

The device according to the invention allows for spacing adjustments to fork position, enhancing precision in material handling. By reducing the physical effort required to reposition the forks, operators are more likely to reposition the forks rather than leaving the forks in an improper position that may damage pallets and the load that is positioned on them.

Proper fork positioning reduces the risk of load shifts or drops during lifting operations. Safety is also enhanced since less stooping by the operator is required to move the fork, and the positioning bar acts as a handle to move the fork.

The device is adaptable to various forklift models. Changing the length of the bridge member makes it compatible with a range of fork sizes. The device is constructed to withstand the rigors of industrial environments, providing long-term reliability without significant maintenance. The invention is preferred to be formed of steel that is as robust as the forks, and the repositioning bar is formed so as to not bend or break when being pushed or pulled by an operator.

The device is useful wherever forklifts are in use, such as warehouses, distribution centers, manufacturing facilities, construction sites, shipping ports and terminals, and retail storage areas.

What is claimed:

1. A device for repositioning a fork of a fork lift, comprising:

a first vertical member, a second vertical member that is spaced apart from the first vertical member, a bridge member connecting the first vertical member to the second vertical member, the bridge member positioned at a top portion of the first vertical member and the second vertical member, a repositioning bar pivotally connected to an outside of the second vertical member, the length of the repositioning bar extending beyond a top of the bridge member when the repositioning bar is fully upwardly and generally vertically positioned, the repositioning bar not extending beyond a front side or a rear side of the second vertical member when the repositioning bar is fully downwardly and vertically positioned, wherein a construct formed by the first vertical member, the second vertical member and the bridge member is constructed and arranged to surround a top and a portion of vertical sides of the fork of the fork lift.

2. A device for repositioning a fork of a fork lift as described in claim 1, further comprising a clamping member constructed and arranged to pull the first vertical member toward the second vertical member.

3. A device for repositioning a fork of a fork lift as described in claim 1, further comprising a repositioning bar retainer extending from an exterior side of the second vertical member that is constructed and arranged to receive and hold the repositioning bar between the second vertical member and the repositioning bar retainer when the repositioning bar is fully downwardly and vertically positioned.

4. A device for repositioning a fork of a fork lift as described in claim 1, further comprising a clamping member constructed and arranged to pull the first vertical member toward the second vertical member, wherein, in use the clamping member is positioned between the fork of the forklift and the forklift.

5. A device for repositioning a fork of a fork lift as described in claim 1, wherein the first vertical member and the second vertical member each have a foot that extends toward a rear of the construct.

6. A device for repositioning a fork of a fork lift as described in claim 1, further comprising a clamping member constructed and arranged to pull the first vertical member toward the second vertical member, and the first vertical member and the second vertical member each have a foot that extends toward a rear of the construct, and wherein the clamping member extends through the foot of the first vertical member and the foot of the second vertical member.

7. A device for repositioning a fork of a fork lift as described in claim 1, wherein the top of the bridge member has an indention formed in a rear portion thereof.

8. A device for repositioning a fork of a fork lift as described in claim 1, further comprising an elastic strap positioned on the top of the bridge member.

9. A device for repositioning a fork of a fork lift as described in claim 1, further comprising an elastic strap positioned on the top of the bridge member, wherein the elastic strap is constructed and arranged to contact and apply pressure to a shank of a positioning pin.

* * * * *